Sept. 9, 1930.  C. A. BAUCOM  1,775,482
ROTARY VALVE
Original Filed Jan. 12, 1929   2 Sheets-Sheet 1
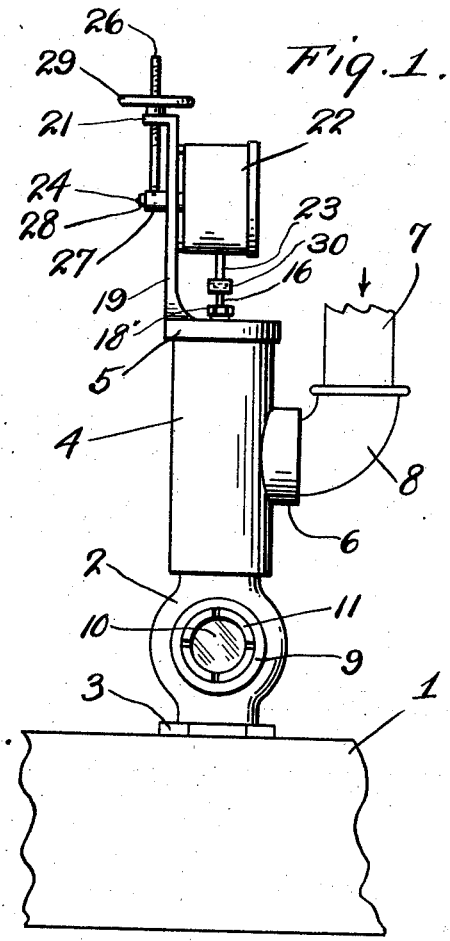
Fig. 1.
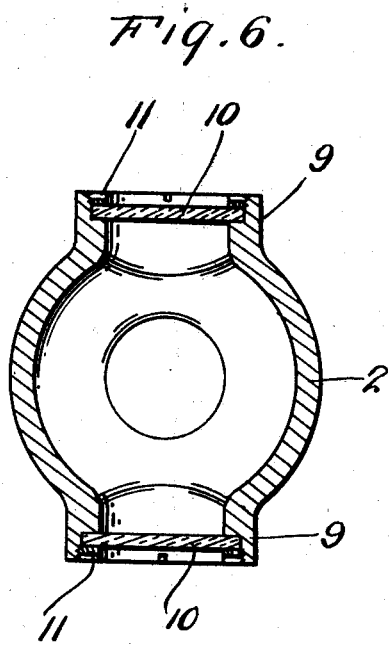
Fig. 6.
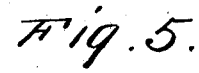
Fig. 5.
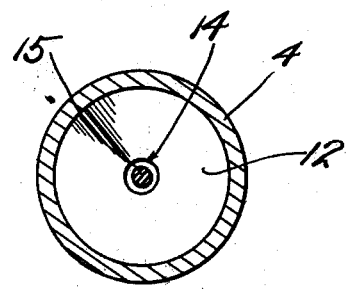
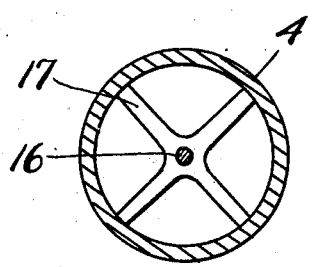
Fig. 4.
Inventor
C. A. Baucom
By *Clarence A. O'Brien*
Attorney Sept. 9, 1930.　　　　C. A. BAUCOM　　　　1,775,482
ROTARY VALVE
Original Filed Jan. 12, 1929　　2 Sheets-Sheet 2
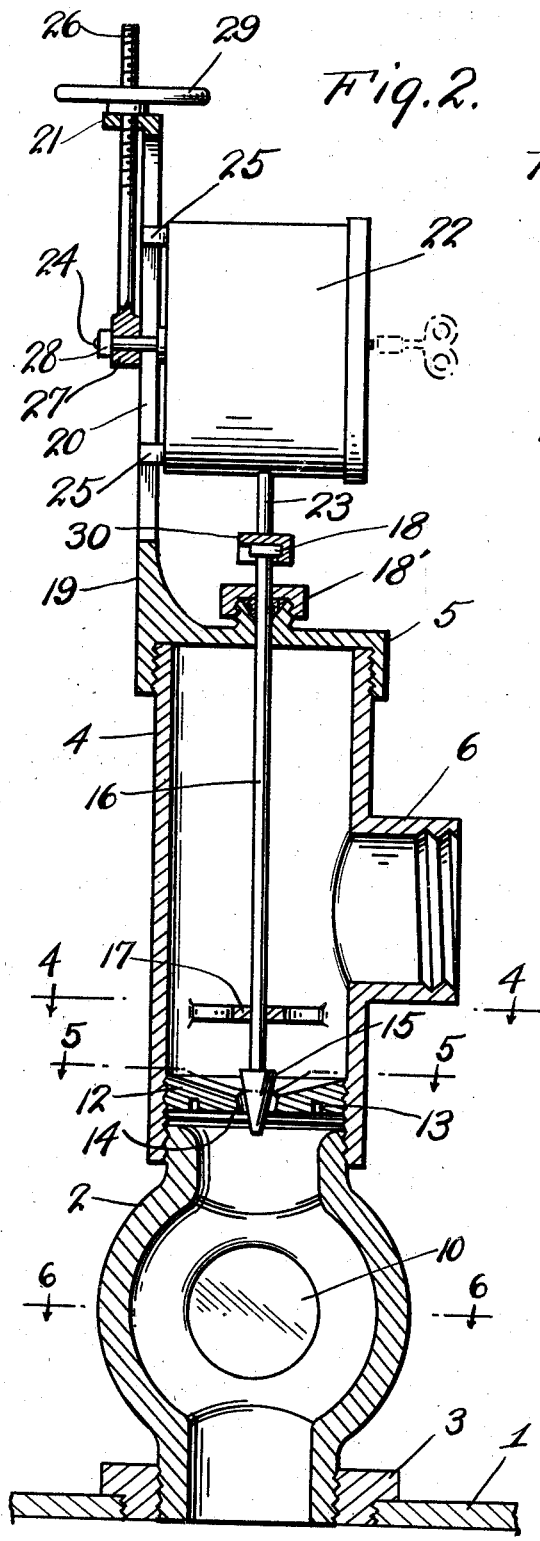
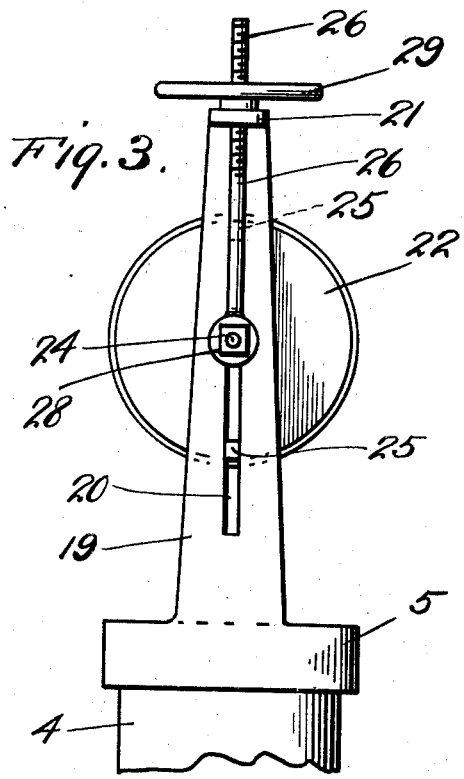
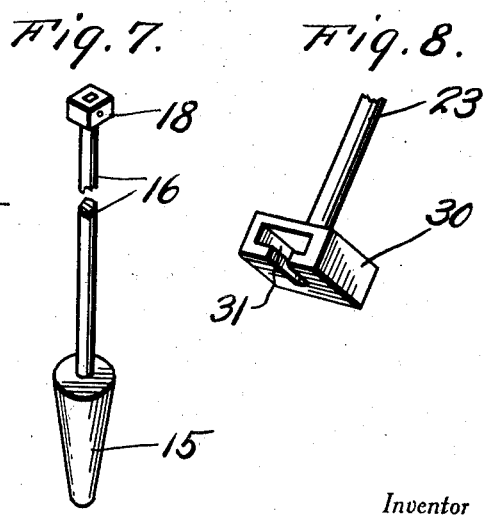
Inventor
C. A. Baucom
By Clarence A. O'Brien
Attorney Patented Sept. 9, 1930

1,775,482

UNITED STATES PATENT OFFICE

CLOVIS A. BAUCOM, OF MIAMI, TEXAS

ROTARY VALVE

Application filed January 12, 1929, Serial No. 331,980. Renewed July 25, 1930.

The present invention relates to improvements in valves and has reference more particularly to a continuously rotating valve for association with the feed line associated with the flow pipe through which flows crude oil from the well to the storage tanks and into which feed pipe is delivered a supply of chemicals for admixture with the crude oil flowing through the flow pipe.

At the present time, in mixing chemicals with the crude oil, the feed line for the chemicals becomes clogged and as a result, the crude oil is not properly treated before entering the storage tank with the usual chemicals that are employed for removing the impurities from the crude oil and which impurities settle to the bottom of the storage tanks by reason of the action of the chemicals admixed with the crude oil.

It is therefore one of the principal aims of the present invention to provide a continuously rotating valve that is arranged within the feed line for the chemicals, thus assuring at all times the positive supply of the chemicals to the pipe through which the crude oil flows.

Still another important object is to provide a means for moving the valve axially with respect to the valve seat to regulate the amount of chemicals that is to be supplied to the crude oil.

Another important object is to provide a valve of the above mentioned character that will at all times be positive and efficient in its operation, the parts being further so constructed as to permit the necessary adjustment without any difficulty. Also the valve mechanism is of such arrangement as to permit its installation without necessitating any material alterations.

Another object is to provide a valve mechanism of the above mentioned character which is simple in construction, inexpensive, strong and durable, and further well adapted to the purpose for which it is designed.

Other objects of the invention will become apparent as the nature of the invention proceeds and when taken in connection with the accompanying drawings.

In the drawings:

Figure 1 is a side elevation of my improved valve structure showing the same associated with the flow pipe through which the crude oil passes and the discharge pipe that leads from the chemical supply container.

Figure 2 is an enlarged sectional view through the valve structure embodying my invention, parts being shown in elevation.

Figure 3 is a rear elevation of the upper portion of the valve structure showing the supporting and adjusting means for the casing for housing the operating mechanism, as well as supporting means for the valve stem.

Figure 4 is a sectional view taken approximately on the line 4—4 of Figure 2, looking downwardly.

Figure 5 is a similar section taken approximately on the line 5—5 of the same figure and also looking downwardly.

Figure 6 is a sectional view taken approximately on the line 6—6 of Figure 2, looking in the direction of the arrows.

Figure 7 is a fragmentary detail perspective view of the valve stem showing the conical shaped valve on the lower end thereof and the square shaped head on its upper end, and Figure 8 is a fragmentary perspective view of the lower end of the operating stem of the clock train mechanism, showing the socket formed on the lower end of said stem for receiving the head on the upper end of the valve stem.

In the drawings, wherein for the purpose of illustration is shown the preferred embodiment of my invention, the numeral 1 designates a portion of the horizontally disposed flow pipe through which the crude oil flows from the well to the storage tank (not shown) in the usual manner.

A fitting such as is shown at 2 is detachably secured at its lower end with a threaded opening provided therefor in the top of the pipe 1, through the medium of the gland 3. The upper end of the fitting 2 provides an inlet for connection with the lower end of the cylindrical pipe section 4, the lower end of this pipe section being internally threaded, while the upper end of the fitting 2 is externally threaded. The upper end of the pipe section 4 is externally threaded for receiving the detachable cap 5.

An inlet nipple 6 is arranged at the side of the pipe 4 at the intermediate portion thereof, for receiving the chemicals that are to be supplied to the crude oil flowing to the pipe 1. A chemical supply pipe 7 that leads from any suitable chemical container (not shown) has communication with the nipple 6 through the medium of the elbow 8 as clearly indicated in Figure 1.

Upon referring to Figure 6 of the drawings, it will be observed that the opposite sides of the globular fitting 2 are provided with lateral projections 9, that extend around openings formed in the opposite sides of the body of the fitting, and suitable transparencies 10 are detachably secured within the extensions to provide a means whereby a person can at all times observe the flow of the chemicals downwardly through the fitting 2 into the pipe 1. The securing means for retaining each of the transparencies in its respective projection 9 is indicated at 11 in Figure 6.

A threaded disc 12 is detachably secured within the threaded lower end of the pipe 4 for disposition above the upper end of the fitting 2 and the bottom face of the disc is formed with sockets 13 for accommodating a spanner wrench to facilitate the insertion or removal of the disc with respect to the pipe 4. The upper face of the disc is bevelled gradually from the central opening 14 to the outer edge of said disc and this opening 14 is slightly tapered and provides a discharge passage for the chemicals supplied to the pipe 4 through the inlet nipple 6.

For the purpose of regulating the flow of the chemicals through the opening 14 and the disc 12, there is provided the conical shaped valve 15 that is carried by the lower end of the valve stem 16 and a suitable spider structure indicated generally at 17 is arranged within the lower portion of the pipe 4 above the disc 12 to guide the valve stem 16. In Figure 4 of the drawings, there is shown a detail of this guide means for the vertically movable as well as rotatable stem 16. The conical valve 15 is adapted to project through the opening 14 and is spaced from the edge of the opening so as to provide an annular discharge passage for the chemicals as clearly indicated in Figure 5.

The upper end of the valve stem 16 extends through a stuffing box 18′ carried by the central portion of the cap 5 and a substantially rectangularly shaped head 18 is carried by the upper end of the valve stem 16 for a purpose to be described in detail in the following paragraph.

A vertically disposed standard 19 is formed integrally at its lower end with the edge portion of a cap 5 and this standard is formed with the longitudinally extending slot 20. The upper end of the standard is disposed laterally as indicated at 21 in the drawings. This lateral extension or lug 21 is formed with an opening.

Arranged for vertical slidable movement on one side of the standard 19 is the clock frame casing 22, within which is housed a conventional clock frame mechanism, and which mechanism is adapted to rotate the depending shaft 23 that projects through the bottom of the casing 22. A stud bolt 24 projects rearwardly from the rear side of the central portion of the casing 22, for disposition through the slots 20, and lugs 25 also project rearwardly from the rear side of the casing 22 for operation within the slot 20 to prevent rotation of the casing 22 and to guide the same in its vertical slidable movement on the standard.

A threaded rod 26 is arranged for vertical movement through the apertured lug 21, the lower end of this rod being formed with a sleeve 27 that encircles the outer end of the stud bolt 24.

A nut 28 is threaded on the outer end of the stud bolt to retain the sleeve 27 on said bolt as clearly shown in Figure 2. A hand wheel 29 is threaded on the upper end of the rod 26 for engagement with the upper face of the apertured lug 21 for raising and lowering the casing 22 and the shaft 23 that is operatively associated with the clock frame mechanism confined within the casing.

Carried by the lower end of the rotatable shaft 23 is the socket 30 that is formed with a T-shaped slot 31, which slot extends inwardly from one side of the socket member for accommodating the head 18 carried by the upper end of the valve stem 16 and when the parts are operatively connected in the manner as shown in the drawings, the stem 16 will rotate with the shaft 23 and at the same time the conical valve 15 will rotate within the opening 14, thus preventing the clogging up of the openings by the chemicals, such as occurs where the valve is stationary.

Also by reason of the threaded rod 26 and the hand wheel 29, the casing 22 may be vertically adjusted whereby to simultaneously adjust the valve 15 axially with respect to the disc 12, so as to regulate the size of the discharge passage for the chemicals.

The provision of a valve structure of this character will at all times insure the proper admixture of the chemicals with the crude oil flowing through the pipe 1 and the continuously rotating valve will absolutely prevent clogging up of the discharge opening in the disc 12. Also the parts are so arranged as to permit the same to be readily and easily adjusted and also assembled or disassembled for cleaning purposes. A valve structure of this character can be installed without necessitating any material alterations and the same will at all times be positive and efficient in carrying out the purposes for which it is designed.

While I have shown the preferred embodiment of my invention, it is to be understood that various changes in the size, shape and arrangement of parts may be resorted to, without departing from the spirit of the invention or the scope of the appended claims.

Having thus described my invention, what I claim as new is:

1. In combination, a horizontal pipe through which crude oil flows, a vertical pipe, a fitting connecting the lower end of said vertical pipe with the horizontal pipe, a chemical supply nipple at the side of the vertical pipe, a disc secured in the bottom of the vertical pipe and provided with a tapered chemical discharge opening in the center thereof, a cap on the upper end of the vertical pipe, a valve stem extending through the cap, a conical valve on the lower end of said stem for disposition through the opening in the disc and being spaced from the edge of the opening, and means arranged on the top of the cap for cooperation with the upper end of the valve stem to continuously rotate said valve in the opening in the disc.

2. In combination, a horizontal pipe through which crude oil flows, a vertical pipe, a fitting connecting the lower end of said vertical pipe with the horizontal pipe, a chemical supply nipple at the side of the vertical pipe, a disc secured in the bottom of the vertical pipe and provided with a tapered chemical discharge opening in the center thereof, a cap on the upper end of the vertical pipe, a valve stem extending through the cap, a conical valve on the lower end of said stem for disposition through the opening in the disc and being spaced from the edge of the opening, means arranged on the top of the cap for cooperation with the upper end of the valve stem to continuously rotate said valve in the opening in the disc, and additional means for axially adjusting the conical valve with respect to the tapered opening in said disc.

3. In combination, a horizontal pipe through which crude oil flows, a vertical pipe, a chemical supply nipple at the side of the vertical pipe, a disc secured in the bottom of the vertical pipe and provided with a tapered chemical discharge opening in the center thereof, a cap on the upper end of the vertical pipe, a valve stem extending through the cap, a conical valve on the lower end of said stem for disposition through the opening in the disc and being spaced from the edge of the opening, and means arranged on the top of the cap for cooperation with the upper end of the valve stem to continuously rotate said valve in the opening in the disc, and additional means for axially adjusting the conical valve with respect to the tapered opening in said disc, and a fitting provided with sight openings connecting the lower end of the vertical pipe with the horizontal flow pipe.

In testimony whereof I affix my signature.

CLOVIS A. BAUCOM.